Patented July 30, 1940

2,209,383

UNITED STATES PATENT OFFICE 2,209,383

PROCESS OF WATERPROOFING FABRICS

Louis H. Bock, Philadelphia, Pa., assignor to Röhm & Haas Company, Philadelphia, Pa.

No Drawing. Application March 5, 1938,
Serial No. 194,073

7 Claims. (Cl. 8—116)

This invention relates to a process for waterproofing fabrics and particularly to a process whereby the fabrics are treated with an aqueous solution of the reaction product of a tertiary amine containing an unsaturated group and a chloromethyl ether of a long chain alcohol.

By superficially modifying cellulose fabrics with the introduction of certain organic chemical compounds a water-repellent effect can be obtained which is not removed either by laundering or dry cleaning. It has heretofore been proposed to waterproof cellulose fabrics by impregnating the fabrics with quaternary ammonium chlorides made by reacting tertiary amines and the chloromethyl ethers of long chain alcohols, and heating the impregnated material to a temperature such that the quaternary ammonium compound is decomposed. The tertiary amines that have been suggested for this process have not, however, been altogether satisfactory. Many tertiary amines, such as trimethylamine for example, form such stable quaternary ammonium salts with the chloromethyl ethers that the high temperatures required to cause them to break down are injurious to the fabric being heated. Others, such as the heterocyclic amines, produce quaternary ammonium salts that are quite unstable in aqueous solution and, in addition, give off toxic fumes when decomposed.

The object of this invention is to produce permanently waterproofed, cellulose fabrics by treating fabrics with aqueous solutions of quaternary ammonium compounds which decompose at temperatures which do not injure the fabric and which do not give off toxic compounds during that decomposition.

These objects have been attained by the use of aqueous solutions of compounds with the general formula

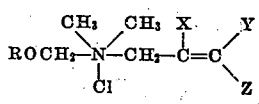

where R is a hydrocarbon group, branched or unbranched, of 12 or more carbon atoms, X, Y and Z are hydrogen or alkyl groups or may be joined together to form an aromatic ring. These quaternary ammonium compounds are prepared by reacting a tertiary amine containing an unsaturated group with a chloromethyl ether of a long chain alcohol in an inert solvent. The chloromethyl ethers may be prepared by any convenient process, e. g. by the reaction of the long chain alcohol, hydrogen chloride, and paraformaldehyde as described in Example 1 of U. S. Patent No. 2,084,125. Typical of the chloromethyl ethers, which are most suitable, are: $C_{12}H_{25}OCH_2Cl$, prepared from dodecyl alcohol;

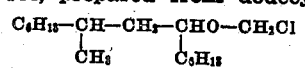

prepared from dicapryl alcohol;

$C_{16}H_{33}$—$OCH_2$—$Cl$ prepared from hexadecyl alcohol; $C_{18}H_{37}OCH_2Cl$, prepared from octadecyl alcohol; etc. Typical tertiary amines which can be used are benzyl dimethylamine, allyl dimethylamine, crotyl dimethylamine, and methylallyl dimethylamine.

The most useful compounds falling under the general formula above may be represented by the simpler formula

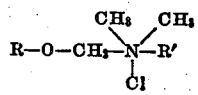

where R is an aliphatic hydrocarbon group of at least 12 carbon atoms and R' is a member of the group consisting of allyl, crotyl, β-methallyl, and benzyl radicals.

The following example is given to illustrate the preparation of the quaternary ammonium chlorides.

Example 1

A solution of 68 g. of benzyl dimethylamine in 100 g. of dry benzene is stirred while 148 g. of hexadecyl chloromethyl ether is added. The mixture is then stirred four hours at 60° C. and a clear solution results. To this solution is added 300 g. of water and the mixture is evaporated under a vacuum to remove the benzene. A clear, aqueous solution containing 50% quaternary ammonium chloride can be so obtained. This solution is stable to storage.

The quaternary ammonium reaction product of the tertiary amine and the chloromethyl ether is diluted with water and applied to the fabric in any convenient manner, usually by immersing the fabric with the solution. The concentration of the solution may vary according to the type of fabric treated and solutions containing between 1% and 10% are ordinarily used. After immersion in the solution, the fabric is dried at a convenient temperature, e. g. 30° C., and then baked at temperatures ranging between 100° and 130° C., which are well below the temperatures harmful to the fabrics. The quaternary ammonium compounds containing an unsaturated group completely decompose at these temperatures without giving off any toxic or otherwise undesirable gases. The fabrics treated are extremely water-repellent and possess a most desirable hand.

The following examples are given to illustrate the process of waterproofing but do not limit it in any way.

Example 2

Cotton duck is immersed in an aqueous solution containing 8% of hexadecyloxymethyl dimethylbenzyl ammonium chloride. It is dried in a current of air at 30° C. and then placed in an oven at 125° C. for 30 minutes. It is then washed in a warm soap solution and dried. The resulting cloth is completely water-repellent and will retain this property after repeated washing or dry cleaning. The preliminary drying at 30° may be omitted if desired, the fabric being dried and baked simultaneously.

Example 3

Viscose rayon shower curtain material is immersed in a 5% solution of hexadecyloxymethyl dimethyl methylallyl ammonium chloride. It is then dried at room temperature and placed in an oven at 120° C. for 30 minutes. After washing in a warm soap solution, it is completely water-repellent.

This process of waterproofing is applicable to all cellulose fabrics including cotton, rayon, and linen. It has many advantages over processes heretofore known, in which materials of a similar character are used, since fabrics are not injured by any temperatures used and no toxic fumes are developed in its application.

I claim:

1. A process for waterproofing cellulose fabrics which comprises wetting the fabric with an aqueous solution of a compound of the general formula

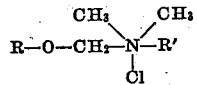

where R is an aliphatic hydrocarbon group of at least 12 carbon atoms, and R' is selected from the group consisting of allyl, crotyl and β-methallyl radicals and benzyl groups, drying the fabric and decomposing the compound on the fabric by heating.

2. A process for waterproofing cellulose fabrics which comprises wetting the fabric with an aqueous solution of hexadecyloxymethyl dimethylbenzyl ammonium chloride, drying the fabric and decomposing the compound on the fabric by heating.

3. A process for waterproofing cellulose fabrics which comprises wetting the fabric with an aqueous solution of hexadecyloxymethyl dimethyl methallyl ammonium chloride, drying the fabric and decomposing the compound on the fabric by heating.

4. A process for waterproofing cellulose fabrics which comprises wetting the fabric with an aqueous solution of hexadecyloxymethyl dimethyl allyl ammonium chloride, drying the fabric and decomposing the compound on the fabric by heating.

5. A process for waterproofing cellulose fabrics which comprises impregnating the fabric with an aqueous solution of a compound of the formula

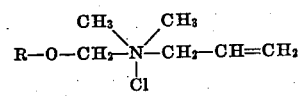

wherein R is an aliphatic hydrocarbon group of at least twelve carbon atoms, drying the fabric and decomposing the compound on the fabric by heating.

6. A process for waterproofing cellulose fabrics which comprises impregnating the fabric with an aqueous solution of a compound of the formula

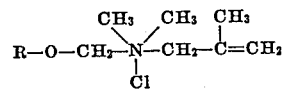

wherein R is an aliphatic hydrocarbon group of at least twelve carbon atoms, drying the fabric and decomposing the compound on the fabric by heating.

7. A process for waterproofing cellulose fabrics which comprises impregnating the fabric with an aqueous solution of a compound of the formula

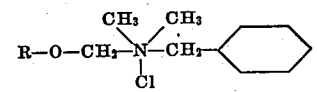

wherein R is an aliphatic hydrocarbon group of at least twelve carbon atoms, drying the fabric and decomposing the compound on the fabric by heating.

LOUIS H. BOCK.